US012178307B2

United States Patent
Hong et al.

(10) Patent No.: US 12,178,307 B2
(45) Date of Patent: Dec. 31, 2024

(54) INSTRUMENTING MAKEUP APPLICATORS FOR IMPROVING AND SHARING APPLICATION TECHNIQUES

(71) Applicant: L'Oreal, Paris (FR)

(72) Inventors: Juwan Hong, Jersey City, NJ (US); Grégoire Charraud, Jersey City, NJ (US); Ji Heun Lee, New York, NY (US)

(73) Assignee: L'Oreal, Paris (FR)

( * ) Notice: Subject to any disclaimer, the term of this patent is extended or adjusted under 35 U.S.C. 154(b) by 55 days.

(21) Appl. No.: 17/937,207

(22) Filed: Sep. 30, 2022

(65) Prior Publication Data

US 2024/0108119 A1 Apr. 4, 2024

(51) Int. Cl.
*A45D 44/00* (2006.01)
*G06F 3/01* (2006.01)
*G06F 3/0346* (2013.01)
*G06T 7/73* (2017.01)
*G06T 11/60* (2006.01)

(52) U.S. Cl.
CPC .......... *A45D 44/005* (2013.01); *G06F 3/014* (2013.01); *G06F 3/016* (2013.01); *G06F 3/0346* (2013.01); *G06T 7/74* (2017.01); *G06T 11/60* (2013.01); *A45D 2200/25* (2013.01); *G06T 2207/10016* (2013.01); *G06T 2207/30201* (2013.01)

(58) Field of Classification Search
None
See application file for complete search history.

(56) References Cited

U.S. PATENT DOCUMENTS

| | | | |
|---|---|---|---|
| 10,324,739 B2* | 6/2019 | Chou | G06F 3/012 |
| 10,646,022 B2* | 5/2020 | Yoganandan | B26B 21/4056 |
| 2011/0013001 A1* | 1/2011 | Craven-Bartle | G06F 3/03545 |
| | | | 348/61 |

(Continued)

OTHER PUBLICATIONS

Invitation to Pay Additional Fees and, Where Applicable, Protest Fee with Annex to Form PCT/ISA/206, Partial Search Report mailed Dec. 8, 2023, issued in corresponding International Application No. PCT/US2023/074510, filed Sep. 18, 2023, 14 pages.

(Continued)

*Primary Examiner* — Jason A Pringle-Parker
(74) *Attorney, Agent, or Firm* — Christensen O'Connor Johnson Kindness PLLC (57) ABSTRACT

In some embodiments, a system for generating presentations of makeup applications is provided. The system comprises a camera, at least one motion sensor associated with a first applicator; and a computing device that includes at least one processor and a non-transitory computer-readable medium having computer-executable instructions stored thereon. The instructions, in response to execution by the at least one processor, cause the computing device to perform actions comprising: receiving a first video of a makeup application process from the camera, wherein the first video depicts at least a portion of a face and at least a portion of an applicator; receiving signals from the at least one motion sensor indicating motion of the applicator; measuring the motion of the applicator with respect to one or more landmarks of the face to determine a relative applicator path; and storing the relative applicator path.

20 Claims, 7 Drawing Sheets

(56) References Cited

U.S. PATENT DOCUMENTS

| | | | |
|---|---|---|---|
| 2014/0126768 A1* | 5/2014 | Ramachandran | G06V 20/40 |
| | | | 382/103 |
| 2016/0139691 A1* | 5/2016 | Li | G06F 40/171 |
| | | | 345/179 |
| 2019/0166980 A1* | 6/2019 | Huang | G06Q 30/02 |
| 2019/0208892 A1* | 7/2019 | Besen | G06F 3/03545 |
| 2020/0126291 A1* | 4/2020 | Nguyen | G06T 19/20 |
| 2021/0298458 A1* | 9/2021 | Barron | G06F 3/04842 |
| 2021/0345016 A1* | 11/2021 | Nakano | G06F 18/2413 |
| 2021/0390311 A1* | 12/2021 | Barron | G06Q 30/0627 |
| 2022/0067380 A1* | 3/2022 | Hsiao | G06F 16/7837 |

OTHER PUBLICATIONS

French Search Report and Written Opinion mailed May 4, 2023, issued in corresponding French Application No. 2212307, filed Nov. 25, 2022, 8 pages.

Mohr, P., et al., "Retargeting Video Tutorials Showing Tools With Surface Contact to Augmented Reality," CHI 2017, May 6-11, 2017, Denver, Colorado, pp. 6547-6558.

International Search Report and Written Opinion mailed Jan. 29, 2024, issued in corresponding International Application No. PCT/US2023/074510, filed Sep. 18, 2023, 20 pages.

* cited by examiner

INSTRUMENTING MAKEUP APPLICATORS FOR IMPROVING AND SHARING APPLICATION TECHNIQUES

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In some embodiments, a method of instrumented makeup application is provided. A computing device receives a first video of a makeup application process, wherein the first video depicts at least a portion of a first face and at least a portion of a first applicator. The computing device measures motion of the first applicator with respect to one or more landmarks of the first face to determine a relative applicator path. The computing device stores the relative applicator path.

In some embodiments, a system for generating presentations of makeup applications is provided. The system comprises a camera, at least one motion sensor associated with a first applicator; and a computing device that includes at least one processor and a non-transitory computer-readable medium having computer-executable instructions stored thereon. The instructions, in response to execution by the at least one processor, cause the computing device to perform actions comprising: receiving a first video of a makeup application process from the camera, wherein the first video depicts at least a portion of a face and at least a portion of an applicator; receiving signals from the at least one motion sensor indicating motion of the applicator; measuring the motion of the applicator with respect to one or more landmarks of the face to determine a relative applicator path; and storing the relative applicator path.

In some embodiments, a computing device is provided. The computing device comprises circuitry for receiving a first video of a makeup application process, wherein the first video depicts at least a portion of a first face and at least a portion of a first applicator; circuitry for measuring motion of the first applicator with respect to one or more landmarks of the first face to determine a relative applicator path; and circuitry for storing the relative applicator path.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION

It is increasingly common for makeup application techniques to be shared amongst people. However, makeup tutorials are typically a video of a person applying makeup to themselves, and a viewer must figure out how to adapt the application of the makeup to their own facial structure. Further, there is no live guidance provided while the viewer is attempting to recreate the makeup application. What is desired are systems that provide presentations that help improve the application of makeup and help the application of makeup match a demonstration application despite differences in facial structure between the demonstrator and the applier.

In embodiments of the present disclosure, a first subject uses an instrumentation computing device to record an application of makeup. From this recording, a relative applicator path is determined that specifies locations of a makeup applicator during the application. The relative applicator path is defined with respect to distances from various facial landmarks, such that the relative applicator path can be presented with respect to other faces by calculating the distances from the various facial landmarks of the other faces. Presentations including, among other things, ghost outlines of applicators, audio feedback, haptic feedback, or visual prompts may be generated in order to help a second subject guide an applicator along the relative applicator path and thereby improve the application of makeup by the second subject.

Figure 1:
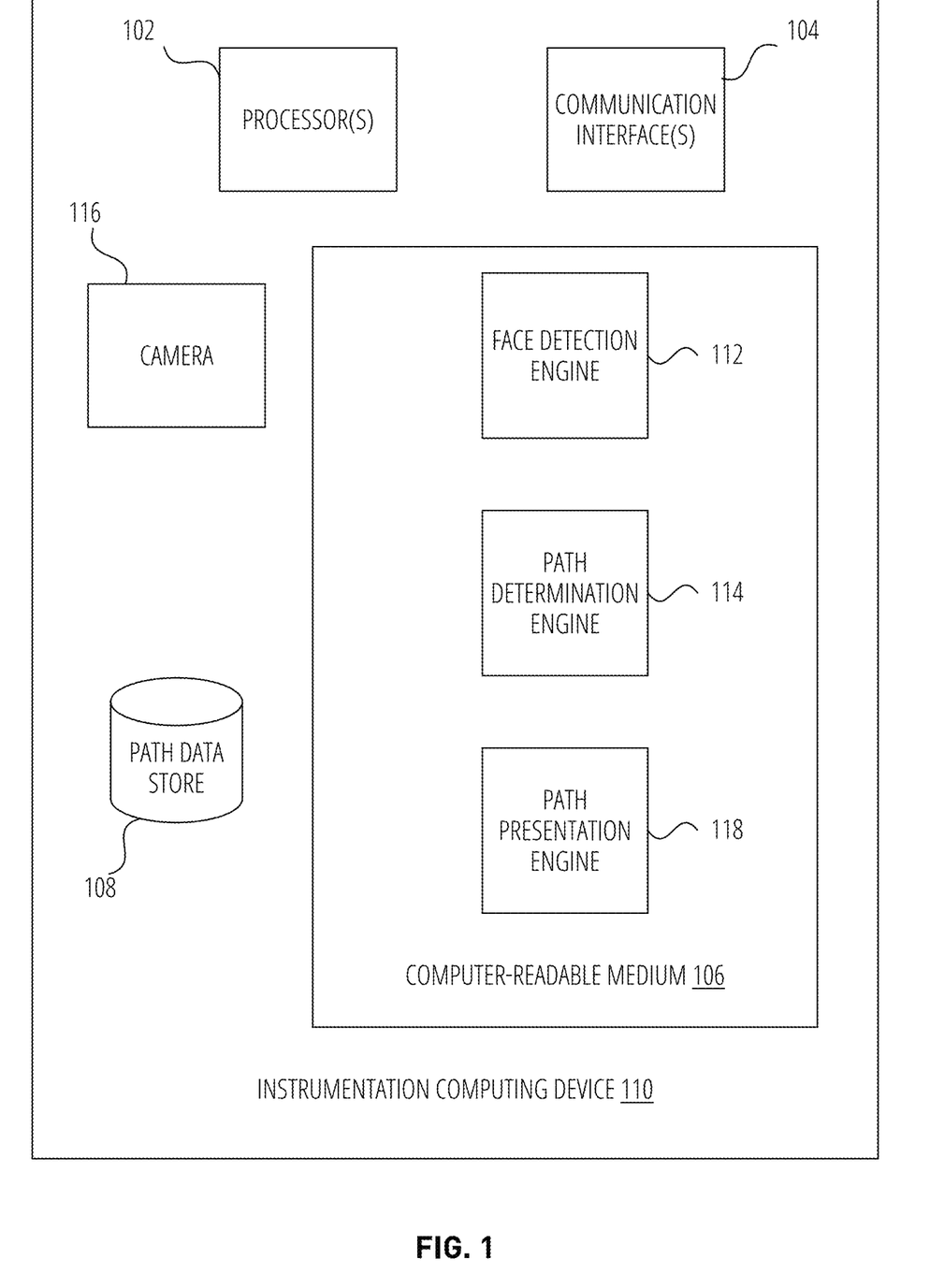
FIG. 1 is a block diagram that illustrates aspects of a non-limiting example embodiment of an instrumentation computing device according to various aspects of the present disclosure.

FIG. 1 is a block diagram that illustrates aspects of a non-limiting example embodiment of an instrumentation computing device according to various aspects of the present disclosure. While the illustrated instrumentation computing device 110 may typically be a mobile computing device such as a smartphone or a tablet, in some embodiments, the instrumentation computing device 110 may be implemented by any computing device or collection of computing devices, including among other things a desktop computing device, a laptop computing device, a mobile computing device, a server computing device, a computing device of a cloud computing device, and/or combinations thereof. As discussed in further detail below, the instrumentation computing device 110 is configured to monitor the application of makeup in order to determine paths of applicators during the application, and to present information based on the determined paths in order to improve subsequent applications of makeup.

As shown, the instrumentation computing device 110 includes one or more processors 102, one or more communication interfaces 104, a path data store 108, a camera 116, and a computer-readable medium 106.

As used herein, "data store" includes among other things any suitable device configured to store data for access by a computing device. One example of a data store is a highly reliable, high-speed relational database management system (DBMS) executing on one or more computing devices and accessible over a high-speed network. Another example of a data store is a key-value store. However, any other suitable storage technique and/or device capable of quickly and reliably providing the stored data in response to queries may be used, and the computing device may be accessible locally instead of over a network, or may be provided as a cloud-based service. A data store may also include data stored in an organized manner on a computer-readable storage medium, such as a hard disk drive, a flash memory, RAM, ROM, or any other type of computer-readable storage medium. One of ordinary skill in the art will recognize that separate data stores described herein may be combined into a single data store, and/or a single data store described herein may be separated into multiple data stores, without departing from the scope of the present disclosure.

As used herein, "computer-readable medium" includes among other things a removable or nonremovable device that implements any technology capable of storing information in a volatile or non-volatile manner to be read by a processor of a computing device, including among other things: a hard drive; a flash memory; a solid state drive; random-access memory (RAM); read-only memory (ROM); a CD-ROM, a DVD, or other disk storage; a magnetic cassette; a magnetic tape; and a magnetic disk storage.

In some embodiments, the processors 102 includes any suitable type of general-purpose computer processor. In some embodiments, the processors 102 include one or more special-purpose computer processors or AI accelerators optimized for specific computing tasks, including among other things graphical processing units (GPUs), vision processing units (VPTs), and tensor processing units (TPUs).

In some embodiments, the communication interfaces 104 include one or more hardware and or software interfaces suitable for providing communication links between components. The communication interfaces 104 may support one or more wired communication technologies (including among other things Ethernet, FireWire, and USB), one or more wireless communication technologies (including among other things Wi-Fi, WiMAX, Bluetooth, 2G, 3G, 4G, 5G, and LTE), and/or combinations thereof.

In some embodiments, the camera 116 includes any type of digital camera or combination of two or more digital cameras configured to capture at least a portion of a face of a subject. In some embodiments, the camera 116 captures images using visible light, images using infrared light, depth information, and/or any other type of image information. Some non-limiting example embodiments of devices suitable for use as the camera 116, either alone or in combination with other devices, include a front-facing camera of a mobile computing device, a stereoscopic camera, and a time-of-flight camera. In some embodiments, the camera 116 includes one or more optical sensors, image sensors, optical transduces, or the like.

As shown, the computer-readable medium 106 has stored thereon logic that, in response to execution by the one or more processors 102, cause the instrumentation computing device 110 to provide a face detection engine 112, a path determination engine 114, and a path presentation engine 118.

As used herein, "engine" includes among other things logic embodied in hardware or software instructions, which can be written in one or more programming languages, including among other things C, C++, C #, COBOL, JAVA™, PHP, Perl, HTML, CSS, JavaScript, VBScript, ASPX, Go, and Python. An engine may be compiled into executable programs or written in interpreted programming languages. Software engines may be callable from other engines or from themselves. Generally, the engines described herein refer to logical modules that can be merged with other engines, or can be divided into sub-engines. The engines can be implemented by logic stored in any type of computer-readable medium or computer storage device and be stored on and executed by one or more general purpose computers, thus creating a special purpose computer configured to provide the engine or the functionality thereof. The engines can be implemented by logic programmed into circuitry such as an application-specific integrated circuit (ASIC), a field-programmable gate array (FPGA), or another hardware device.

In some embodiments, the face detection engine 112 is configured to use information gathered by the camera 116 to construct a model of a face of a subject, and to detect facial landmarks within the model. In some embodiments, the path determination engine 114 is configured to determine a path traced by an applicator during application of makeup to the face based on one or more of information gathered by the camera 116 and motion sensor data associated with the applicator and received via a communication interface 104. In some embodiments, the path determination engine 114 determines the path relative to the facial landmarks detected by the face detection engine 112, and stores the relative applicator path in the path data store 108. In some embodiments, the path presentation engine 118 is configured to generate a presentation of a relative applicator path from the path data store 108 to help improve a subsequent application of makeup.

In some embodiments, the path determination engine 114 includes computational circuitry configured to generate a pixel-wise prediction score for a presence or absence of an applicator in an image using one or more convolutional neural network image classifiers. In some embodiments, the path determination engine 114 includes computational circuitry configured to predict an applicator-traversed path and to generate a virtual display of the predicted applicator-traversed path on at least a portion of the user's face based on the pixel-wise prediction scores for the presence or absence of the applicator in the image.

Further description of the configuration of each of these components is provided below.

Figure 2:
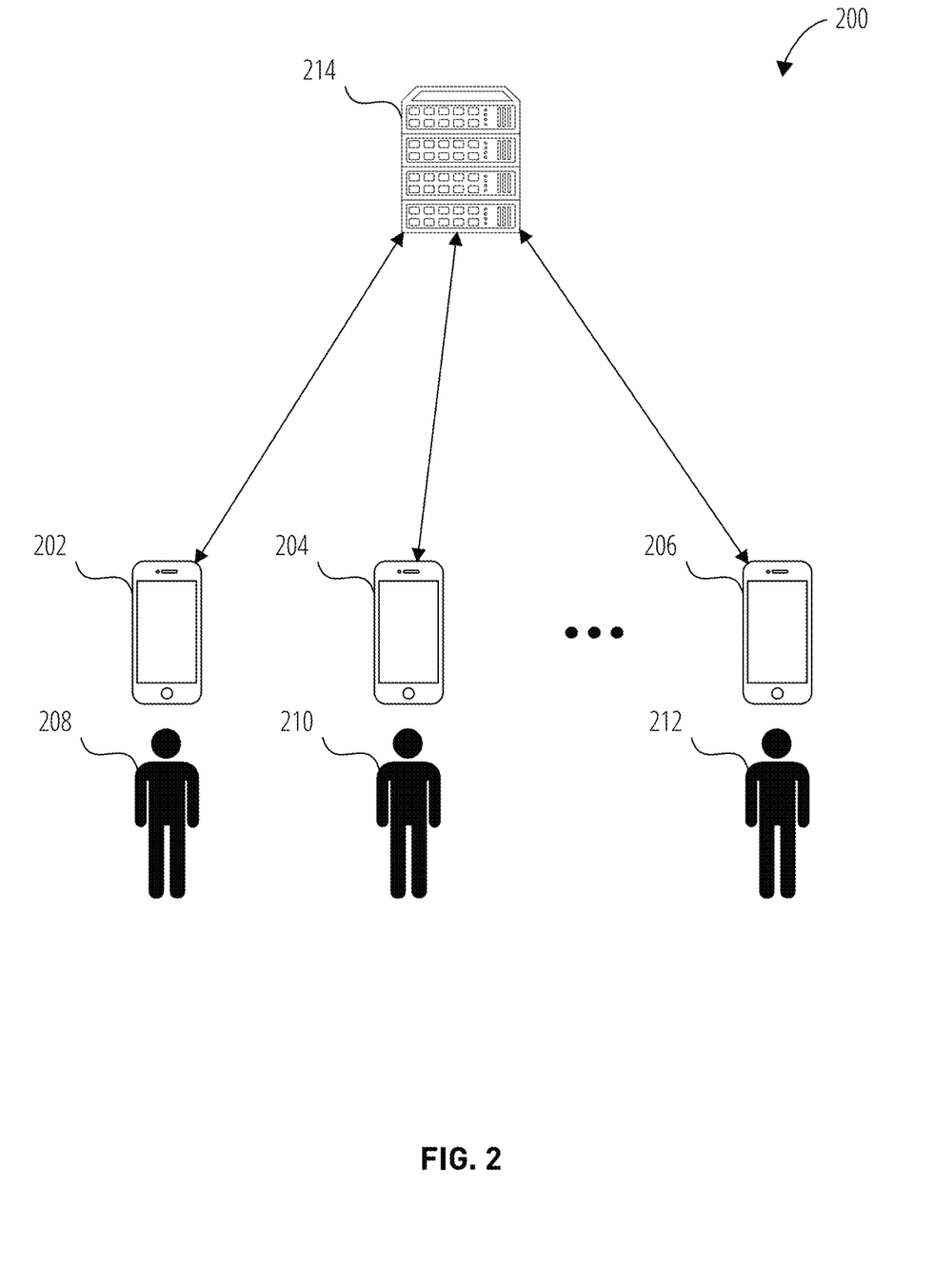
FIG. 2 is a schematic drawing that illustrates a non-limiting example embodiment of a system that allows sharing of relative applicator paths between subjects according to various aspects of the present disclosure.

While generating a presentation of a relative applicator path to a subject that recorded the relative applicator path can be useful in supporting consistent and repeatable application of makeup by the subject, one benefit provided by embodiments of the present disclosure that use relative applicator paths defined with respect to facial landmarks is the ability to share relative applicator paths between subjects. FIG. 2 is a schematic drawing that illustrates a non-limiting example embodiment of a system that allows sharing of relative applicator paths between subjects according to various aspects of the present disclosure. As shown, the system 200 includes a first instrumentation computing device 202 that is used by a first subject 208, a second instrumentation computing device 204 that is used by a second subject 210, and a third instrumentation computing device 206 that is used by a third subject 212. Though three instrumentation computing devices and subjects are illustrated in FIG. 2, in some embodiments, more or fewer instrumentation computing devices and subjects may be present in the system 200.

The first subject 208 may use the first instrumentation computing device 202 to determine and save a relative applicator path, which the first instrumentation computing device 202 then transmits to a path management computing system 214. The path management computing system 214 then transmits the relative applicator path to the second instrumentation computing device 204 and the third instrumentation computing device 206.

Since the relative applicator path is recorded by the first subject 208 but is defined with respect to facial landmarks, the same facial landmarks can be determined for other subjects, and the relative applicator path can be presented to the other subjects as if they had originally recorded them. In other words, the second instrumentation computing device 204 can present the relative applicator path to match the facial features of the second subject 210 and the third instrumentation computing device 206 can present the relative applicator path to match the facial features of the third subject 212.

In some embodiments, the path management computing system 214 provides a variety of functionality that is enabled by the ability to exchange relative applicator paths between subjects. For example, in some embodiments, the path management computing system 214 may provide an interface that allows a second subject 210 to query for tutorials of particular makeup applications (e.g., a cat eye eyeliner looks, a smoky eye look, etc.). The path management computing system 214 may provide one or more relevant relative applicator paths to the second instrumentation computing device 204 for creating the look that were generated by, perhaps, the first subject 208 using the first instrumentation computing device 202, and the second instrumentation computing device 204 presents the relative applicator paths to the second subject 210. Such an embodiment may be useful for influencers and others to build an audience and improve the ability to guide subjects through makeup tutorials.

As another example, in some embodiments, the path management computing system 214 may provide a social connection interface that allows subjects to connect with each other to provide preference information relating to looks, colors, and/or products; share relative applicator paths; review relative applicator paths posted by others; and so on. The social connection interface may then use a recommender engine to determine one or more recommended relative applicator paths that a subject may like based on their preference information and the reviews they have posted, and may provide the recommended relative applicator paths to the instrumentation computing device associated with the subject for presentation.

Figure 3:
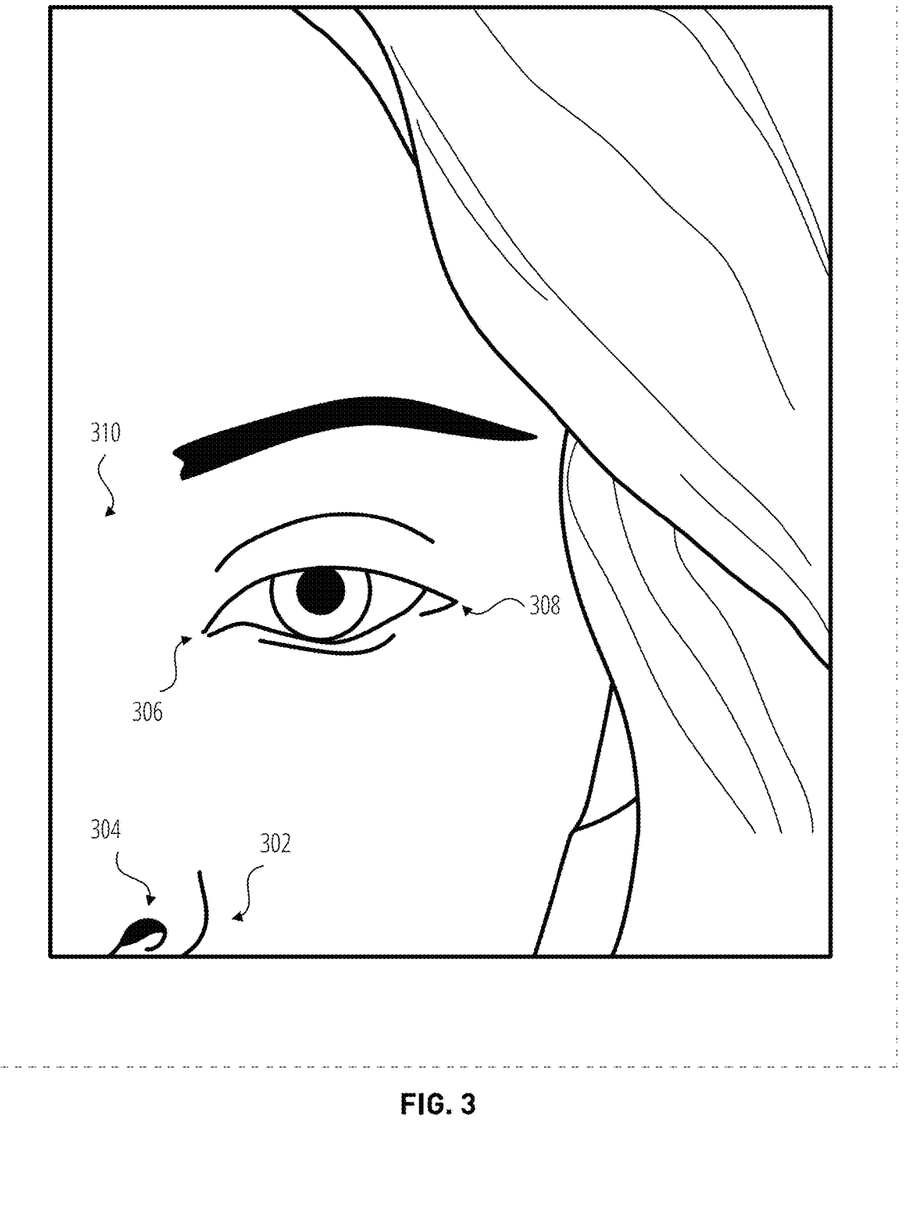
FIG. 3 is an illustration showing a non-limiting example embodiment of a video captured of a face of a subject according to various aspects of the present disclosure.

FIG. 3 is an illustration showing a non-limiting example embodiment of a video captured of a face of a subject according to various aspects of the present disclosure. In some embodiments, the video may be presented on a display of an instrumentation computing device (such as a mobile computing device) while the video is being captured, though the instrumentation computing device itself is not illustrated in FIG. 3 (or the remainder of the figures in the present disclosure) for the sake of clarity.

FIG. 3 illustrates a few non-limiting examples of facial landmarks that may be detected by the face detection engine 112. As shown, the video includes an ala 302, or "wing" of the nose; a naris 304, or "nostril"; an inner canthus of the eye 306; an outer canthus of the eye 308; and a nasion 310, a midline junction between the eyes and below the eyebrows. In some embodiments, other facial landmarks, including among other things features of the lips, ears, bone structure, and/or other facial landmarks may be detected. In some embodiments, the surface contour of the face may itself be used as a facial landmark. By finding these facial landmarks within a model of the face in the video, a relative applicator path (relative to the facial landmarks) can be determined and stored.

Figure 4A:
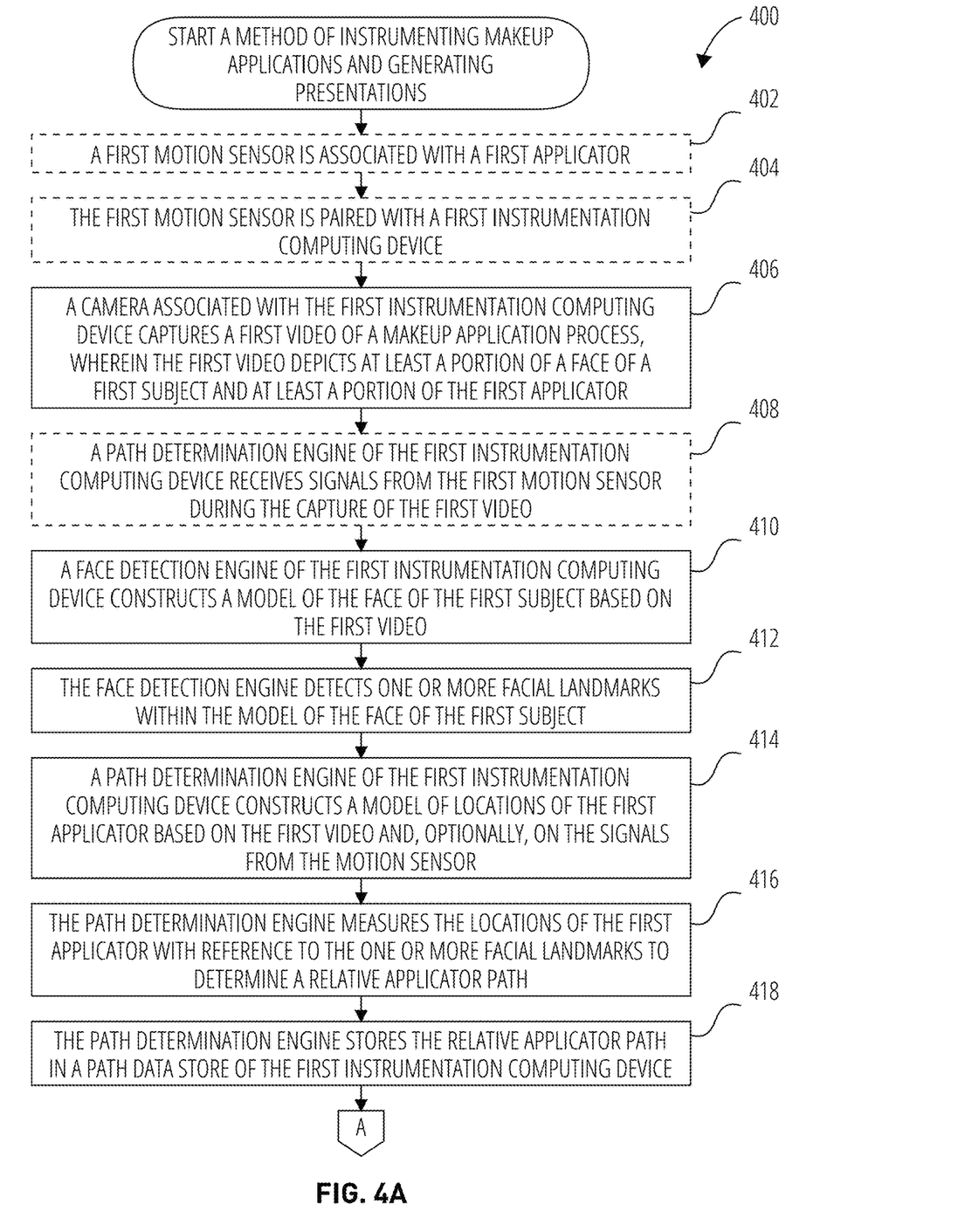
FIG. 4A-FIG. 4B are a flowchart that illustrates a non-limiting example embodiment of a method of instrumenting makeup applications and generating presentations according to various aspects of the present disclosure.
Figure 4B:
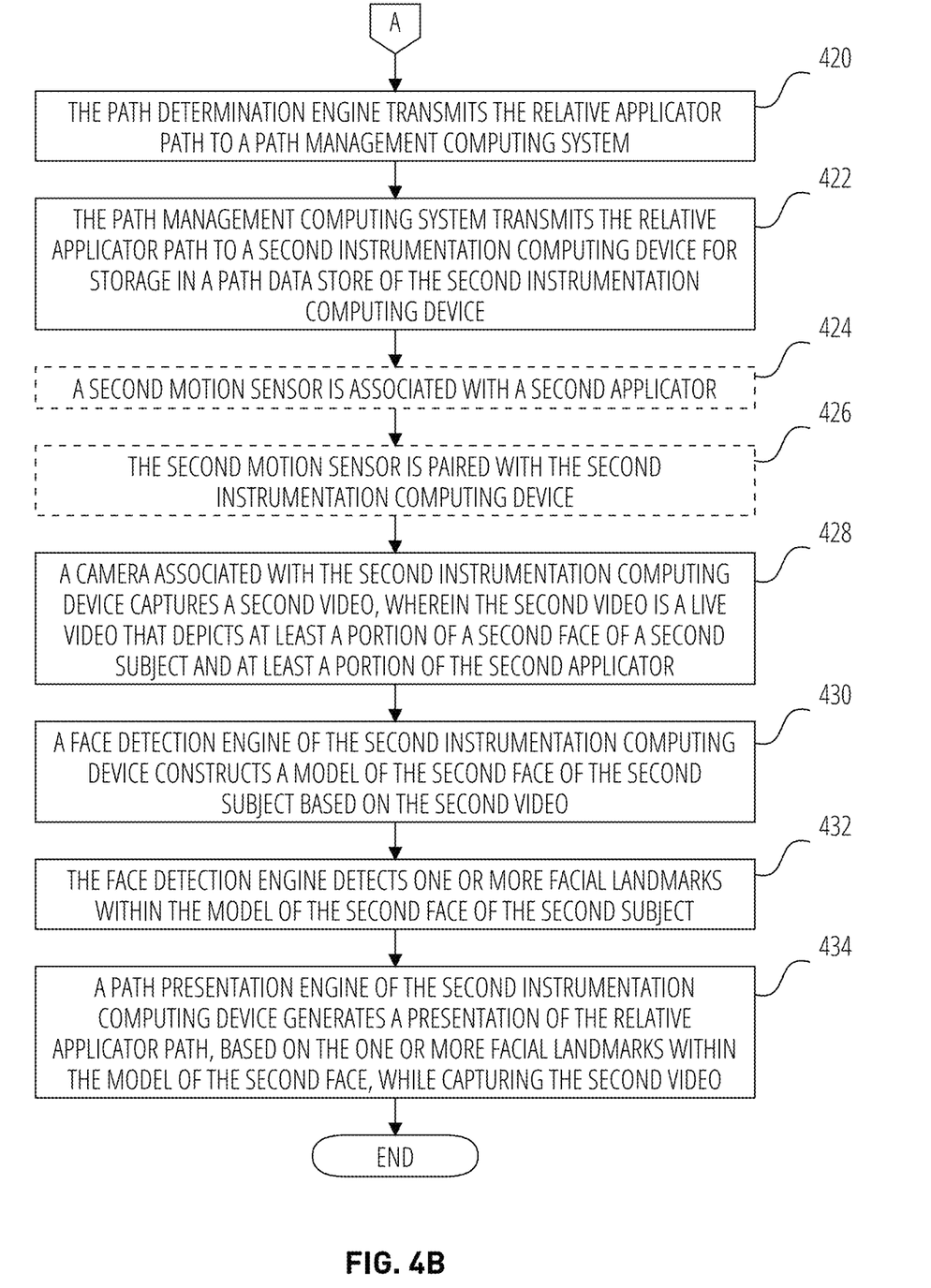

FIG. 4A-FIG. 4B are a flowchart that illustrates a non-limiting example embodiment of a method of instrumenting makeup applications and generating presentations according to various aspects of the present disclosure. In the method 400, a relative applicator path is determined while recording an application of makeup. The relative applicator path can then be used to generate presentations during a second application of makeup to improve the second application of makeup, as described above.

From a start block, the method 400 proceeds to optional block 402, where a first motion sensor is associated with a first applicator. In some embodiments, the first motion sensor includes a three-axis, six-axis, or nine-axis accelerometer that generates signals representing an orientation, position, and/or motion of the motion sensor (and, by association, any object the motion sensor is attached to). In some embodiments, other types of motion sensors, including among other things a photo sensor, a camera, a magnetic sensor, a tomographic sensor, an infrared sensor, an ultrasonic sensor, a force sensor, and/or combinations thereof.

The motion sensor may be associated with the first applicator in any suitable way. For example, the motion sensor may be incorporated into a housing of the first applicator, or otherwise permanently joined with the first applicator. As another example, the motion sensor may be removably coupled to the first applicator, such as with a clip, a strap, a detent, a pocket, or other removable coupling means. As yet another example, the motion sensor may be attached to a glove, a watch, or another wearable device worn by the subject on the hand holding the first applicator.

At optional block 404, the first motion sensor is paired with a first instrumentation computing device 110. In some embodiments, the first motion sensor communicates via Bluetooth, Wi-Fi or another wireless communication technology, and pairing the first motion sensor with the first instrumentation computing device 110 causes the first motion sensor to transmit information to the first instrumentation computing device 110. In some embodiments, pairing the first motion sensor with the first instrumentation computing device 110 may include using the camera 116 of the first instrumentation computing device 110 to scan an identifier of the first motion sensor. Blocks 402 and 404 are described as being optional because, in some embodiments, the method 400 may operate using the video information without the motion sensor information.

At block 406, a camera 116 associated with the first instrumentation computing device 110 captures a first video of a makeup application process, wherein the first video depicts at least a portion of a face of a first subject and at least a portion of the first applicator. In some embodiments, the first video includes a two-dimensional depiction of a scene that includes the portion of the face of the first subject and the portion of the first applicator. In some embodiments, the first video includes a three-dimensional depiction of the scene. In some embodiments, the first video includes depth information to accompany the two-dimensional depiction of the scene.

Figure 5:
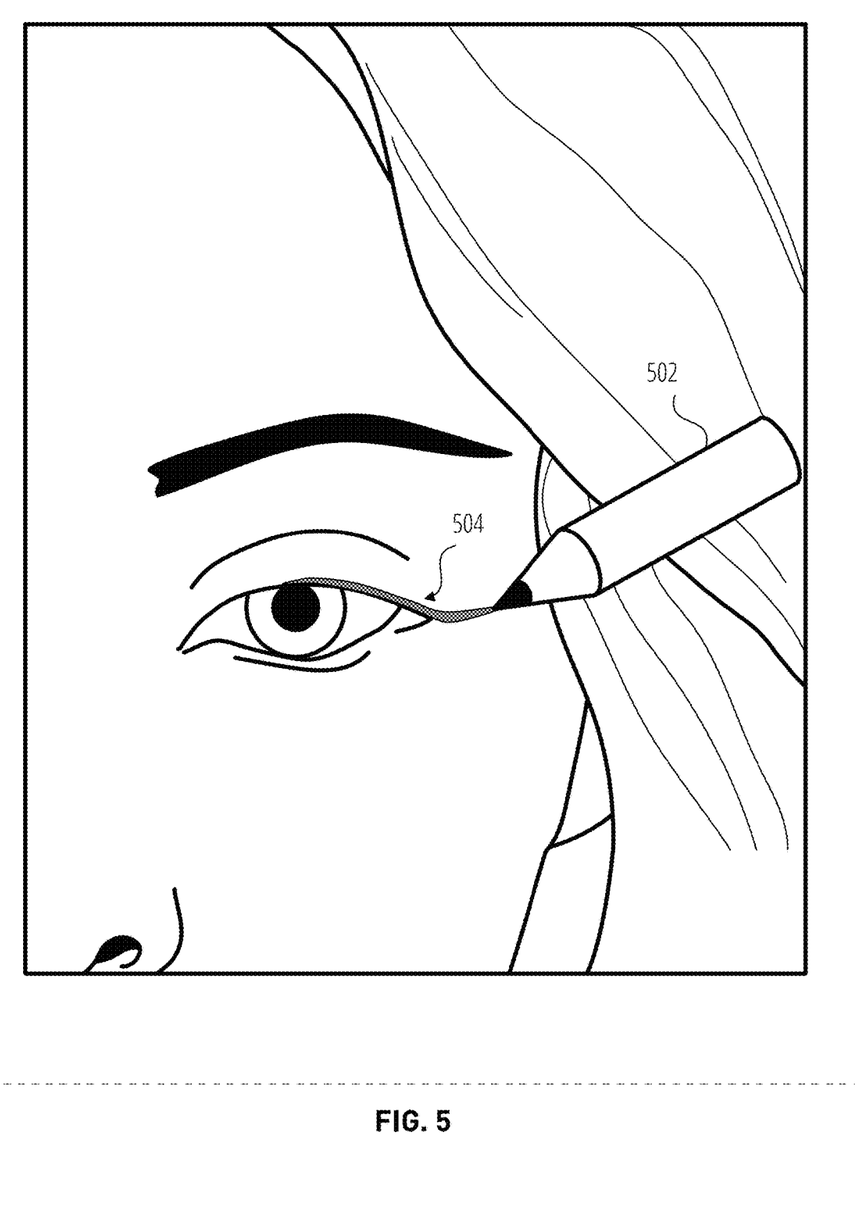
FIG. 5 illustrates a non-limiting example embodiment of a frame of a first video of a makeup application process according to various aspects of the present disclosure.

FIG. 5 illustrates a non-limiting example embodiment of a frame of a first video of a makeup application process according to various aspects of the present disclosure. The frame depicted in FIG. 5 is a non-limiting example of a frame of a first video captured at block 406. In the frame, a portion of the face of the first subject is visible, and the first subject is applying makeup using the first applicator 502. In the illustrated embodiment, the first applicator 502 is an eyeliner pencil, and the applied makeup 504 is eyeliner, but these examples should not be seen as limiting. In other examples, the first applicator 502 may be a brush, a sponge, a tweezer, a powder puff, a makeup printer, or any other type of tool usable to apply makeup. In other examples, the applied makeup 504 may be lipstick, blush, mascara, foundation, concealer, or any other type of makeup.

Returning to FIG. 4A, the method 400 proceeds to optional block 408, where a path determination engine 114 of the first instrumentation computing device 110 receives signals from the first motion sensor during the capture of the first video. The signals indicate the orientation, position, and/or motion of the first motion sensor, and therefore the first applicator, during the video. In some embodiments, the path determination engine 114 correlates these signals to the depiction of the first applicator in the first video. The actions of block 408 are illustrated and described as optional because, in some embodiments, the method 400 may operate using the video data without the motion sensor signals.

At block 410, a face detection engine 112 of the first instrumentation computing device 110 constructs a model of the face of the first subject based on the first video. In some embodiments, the model of the face may be a two-dimensional model based on two-dimensional information present in the first video. In some embodiments, the model of the face may be a three-dimensional model constructed from a point cloud derived from depth information or other three-dimensional information in the first video. In some embodiments, the model of the face may be a three-dimensional model constructed from two-dimensional information present in the first video using, for example, machine learning image processing techniques (e.g., LOLNeRF developed by Google, Inc.). In some embodiments, constructing the model may include predicting portions of the model that are obscured in one or more frames of the first video, such as portions of the face that are hidden by the first applicator or by a hand of the subject. In some embodiments, an initial model of the face may be constructed based on a portion of the first video captured with an unobstructed view of the face (e.g., prior to the start of the makeup application).

At block 412, the face detection engine 112 detects one or more facial landmarks within the model of the face of the first subject. In some embodiments, the one or more facial landmarks are detected within the model itself. In some embodiments, the one or more facial landmarks are detected in two-dimensional images of the first video and then correlated to locations within the model of the face. Any suitable technique for detecting the facial landmarks may be used, including among other things the image processing routines provided by the open source dlib library that is publicly available.

At block 414, a path determination engine 114 of the first instrumentation computing device 110 constructs a model of locations of the first applicator based on the first video and, optionally, on the signals from the motion sensor. In some embodiments, the path determination engine 114 uses similar techniques used in block 410 to build the model of the face to build a similar model of the first applicator in the same coordinate space as the model of the face, and as with the techniques in block 410, may generate a two-dimensional model or a three-dimensional model.

The use of the motion sensor is optional because in some embodiments, the information in the first video may be adequate to construct the model of the locations of the first applicator. In other embodiments, the motion sensor signals may be used to enhance the detail of the model of locations, including providing detailed rotation and attitude information that may not be readily apparent in the first video. The motion sensor signals may be particularly useful if a large portion of the first applicator is obscured in the first video (e.g., if the subject grips the first applicator close to a tip of the first applicator, such that most of the first applicator is hidden from view, etc.) or if the first applicator is smooth, reflective, or otherwise designed in such a way that detailed features of the first applicator other than the shape are not easily detectable in the first video.

At block 416, the path determination engine 114 measures the locations of the first applicator with reference to the one or more facial landmarks to determine a relative applicator path. Once the models of the face and the first applicator are generated, the relative distances between the first applicator and the facial landmarks may be easily measured at each frame of the first video. The relative distances for each frame can then be combined in series to create the relative applicator path. The relative applicator path may also include the attitude (e.g., incidence angle compared to a surface normal, twisting over time, etc.) of the first applicator with respect to the facial landmarks. In some embodiments, the first applicator may also include a force sensor that transmits signals to the instrumentation computing device 110, such that an amount of force with which the first applicator is applied may be included as part of the relative applicator path. In some embodiments, an amount of force with which the first applicator is applied may be determined by measuring an amount of deflection of at least a portion of the first applicator is visible in the first video.

At block 418, the path determination engine 114 stores the relative applicator path in a path data store 108 of the first instrumentation computing device 110. The method 400 then proceeds to a continuation terminal ("terminal A").

From terminal A (FIG. 4B), the method 400 proceeds to block 420, where the path determination engine 114 transmits the relative applicator path to a path management computing system 214, and at block 422, the path management computing system 214 transmits the relative applicator path to a second instrumentation computing device 110 for storage in a path data store 108 of the second instrumentation computing device 110. As discussed above, the path management computing system 214 may distribute the relative applicator path to the second instrumentation computing device 110 for a variety of reasons. For example, a second subject associated with the second instrumentation computing device 110 may browse relative applicator paths or transmit a query for relative applicator paths, and the path management computing system 214 may transmit the relative applicator path to the second instrumentation computing device 110 in response to the request. As another example, the path management computing system 214 may push the relative applicator path to the second instrumentation computing device 110 without receiving a request if the path management computing system 214 determines that the second subject associated with the second instrumentation computing device 110 may be interested in the relative applicator path.

At optional block 424, a second motion sensor is associated with a second applicator, and at optional block 426, the second motion sensor is paired with the second instrumentation computing device 110. The association of the second motion sensor with the second applicator and the pairing with the second instrumentation computing device 110 is similar to that discussed above with respect to the first motion sensor, the first applicator, and the first instrumentation computing device 110, and so is not discussed in further detail here for the sake of brevity.

At block 428, a camera 116 associated with the second instrumentation computing device 110 captures a second video, wherein the second video is a live video that depicts at least a portion of a second face of a second subject and at least a portion of the second applicator. As used herein, a "live video" is a video that is captured and processed in real-time, and that continues to be captured during subsequent actions of the method 400. One non-limiting example of a capture of a live video is a capture of a selfie video by a front-facing camera of a mobile computing device, where the selfie video is presented on a display of the mobile computing device while the video is being captured, such that the display of the mobile computing device appears similar to a mirror. Another non-limiting example of a capture of a live video is a capture of a video by another type of camera which is streamed to the second instrumentation computing device 110 while it is being captured.

At block 430, a face detection engine 112 of the second instrumentation computing device 110 constructs a model of the second face of the second subject based on the second video, and at block 432, the face detection engine 112 detects one or more facial landmarks within the model of the second face of the second subject. The techniques for constructing the model of the second face and detecting the facial landmarks are similar to those discussed above with respect to the first face, and so are not described again here for the sake of brevity.

At block 434, a path presentation engine 118 of the second instrumentation computing device 110 generates a presentation of the relative applicator path, based on the one or more facial landmarks within the model of the second face, while capturing the second video. As part of generating the presentation of the relative applicator path, the path presentation engine 118 may align the relative applicator path to the live video by finding the facial landmarks in the live video and determining the location for the presentation based on the distances to the facial landmarks indicated by the relative applicator path.

In various embodiments, various different types of presentations may be made, each of which may help improve the application of the makeup by the second subject. As one non-limiting example, the presentation may use the relative applicator path and the facial landmarks of the second face to determine where the second applicator would be located if applying the same makeup pattern to the second face instead of the first face, and may then generate images to be superimposed on the live video to guide the second applicator along the relative applicator path. In some embodiments, the presentations may not be made if the second applicator is found to be within a margin of error of the relative applicator path.

Figure 6:
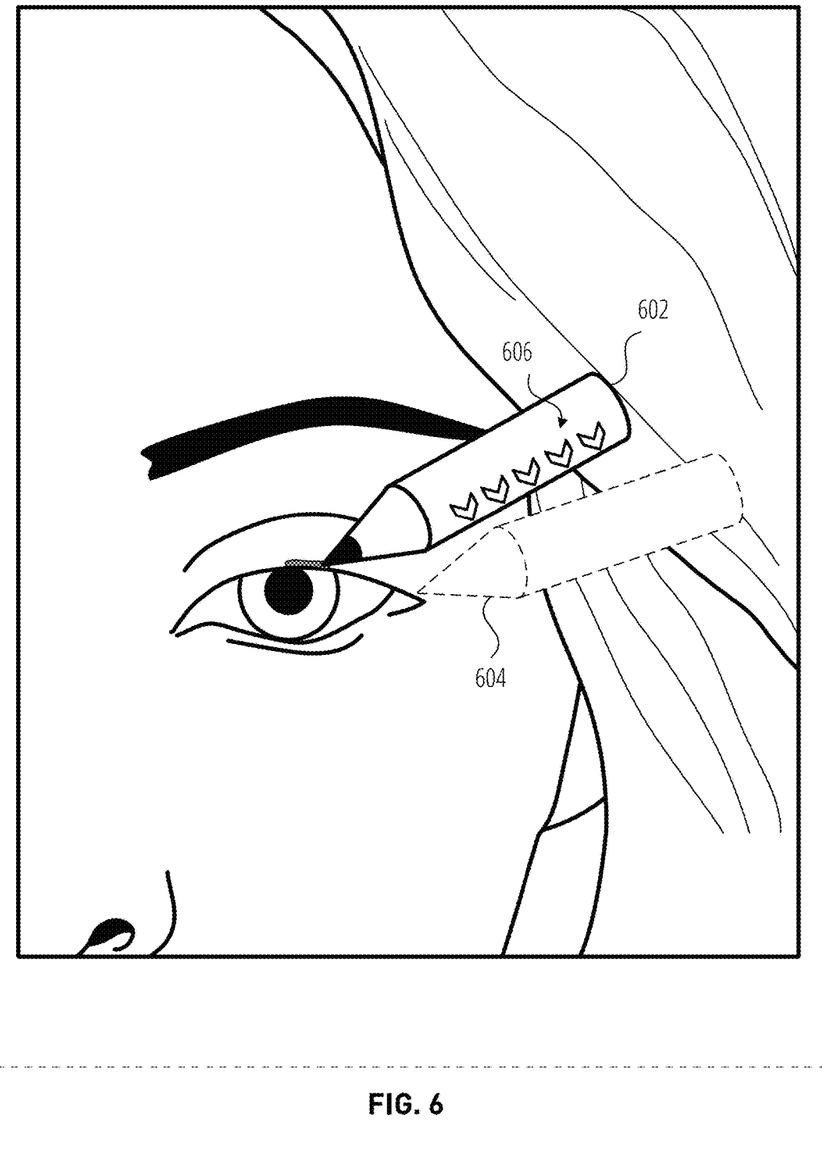
FIG. 6 illustrates a non-limiting example embodiment of a frame of a second video with superimposed images according to various aspects of the present disclosure.

FIG. 6 illustrates a non-limiting example embodiment of a frame of a second video with superimposed images according to various aspects of the present disclosure. In FIG. 6, a portion of a face of a second subject, different from the first subject that was used to initially determine the relative applicator path, is shown. The face of the second subject will have a different shape (e.g., different eye shapes and locations, different nose shapes and locations, etc), but the relative applicator path represents the locations of the applicator with respect to facial landmarks and not an absolute location, and so the path presentation engine 118 will be able to compensate for the differences in the shapes of the faces.

In the frame, the portion of the face and the second applicator 602 are visible. Two different types of presentations are illustrated. A first type of presentation is a ghost presentation 604. In the ghost presentation 604, a translucent shape, an outline, or another form of presentation that is meant to represent the ideal location of the second applicator 602 to correspond with the location of the first applicator in the relative applicator path is shown. In each frame, the ghost presentation 604 may be moved to coincide with the continuation of the relative applicator path such that the ghost presentation 604 appears to be animated along the relative applicator path, and may also be moved based on movement of the facial landmarks to remain in a fixed relative position with respect to the face.

A second type of presentation illustrated in FIG. 6 is an indicator presentation 606. In the indicator presentation 606, instead of fully depicting the desired location of the second applicator 602, a plurality of indicators are superimposed on the second applicator 602 to prompt a desired motion of the second applicator 602 (in this case, a row of chevrons indicating the desired direction of movement of the second applicator 602).

Though both the ghost presentation 604 and the indicator presentation 606 are shown in FIG. 6, in some embodiments, only a single type of presentation may be made. In some embodiments, other types of presentations may be made. For example, if the second applicator 602 is determined to be outside of a predetermined range around the relative applicator path, an auditory or haptic indication may be provided to prompt movement of the second applicator 602 back to the relative applicator path. Also, in embodiments wherein the relative applicator path includes an amount of pressure applied by the applicator, the presentation may include a visual, auditory, or haptic indication when it is determined that an amount of pressure being applied with the second applicator 602 is different from the amount of pressure indicated by the relative applicator path.

Returning to FIG. 4B, after the generation of the presentation, the method 400 then proceeds to an end block and terminates.

In the description of method 400, embodiments wherein the relative applicator path is determined during a makeup application by a first subject to their own face, and the relative applicator path is then used during a makeup application by a second subject to their own face for the sake of clearly describing various aspects of the disclosed subject matter. However, in other embodiments, different situations may arise. For example, in some embodiments, the first subject may record the relative applicator path, and then may also replay the relative applicator path in order to ensure consistency between multiple makeup applications. As another example, in some embodiments, the first subject may record the relative applicator path on a first side of the face, provide a command to mirror the relative applicator path, and then use the relative applicator path on the second side of the face in order to provide symmetrical application.

As still another example, the subject and a person applying the makeup may be different people. In such an embodiment, the person applying the makeup may use a head-mounted display or other augmented reality device to overlay presentations on the subject while applying the makeup. Such embodiments may have additional use cases in which a first person performs tasks relating to interacting with different faces. For example, a first dental hygienist may record a relative applicator path to track a path of a dental tool in a first mouth, and a second dental hygienist may view the presentations related to the relative applicator path when using the dental tool in a second mouth. In such an embodiment, landmarks within the mouth may be used (e.g., locations of specific teeth) instead of the facial landmarks discussed above.

While illustrative embodiments have been illustrated and described, it will be appreciated that various changes can be made therein without departing from the spirit and scope of the invention.

The invention claimed is:

1. A system for generating presentations of makeup applications, the system comprising:
a camera;
at least one motion sensor associated with a first applicator; and
a computing device that includes at least one processor and a non-transitory computer-readable medium having computer-executable instructions stored thereon that, in response to execution by the at least one processor, cause the computing device to perform actions comprising:
receiving, by the computing device, a first video of a makeup application process from the camera, wherein the first video depicts at least a portion of a face and at least a portion of an applicator;
receiving, by the computing device, signals from the at least one motion sensor indicating motion of the applicator;
measuring, by the computing device, the motion of the applicator with respect to one or more landmarks of the face to determine a relative applicator path;
measuring, by the computing device, an amount of deflection shown in the first video of the portion of the applicator to determine an amount of force with which the applicator is applied;
adding, by the computing device, the amount of force to the relative applicator path; and
storing, by the computing device, the relative applicator path.

2. The system of claim 1, wherein the at least one motion sensor is removably coupled to the applicator, is permanently attached to the applicator, or is coupled to a glove worn by a hand holding the applicator.

3. The system of claim 1, wherein the computing device is a mobile computing device that includes a display.

4. The system of claim 3, wherein the camera is a front-facing camera of the mobile computing device.

5. The system of claim 4, wherein the actions further comprise:
receiving, by the computing device, a second video from the camera, wherein the second video is a live video that depicts at least a portion of the face and at least a portion of the applicator;
aligning, by the computing device, the relative applicator path to one or more landmarks of the face; and
presenting, by the computing device, the relative applicator path in association with capturing the second video.

6. The system of claim 5, wherein the first video and the second video include depth information.

7. The system of claim 5, wherein presenting the relative applicator path in association with capturing the second video includes providing the presentation of the relative applicator path as superimposed images on the second video on the display.

8. The system of claim 5, wherein presenting the relative applicator path in association with capturing the second video includes:
comparing a detected location of the applicator to the relative applicator path; and
providing haptic feedback in response to determining that the detected location of the applicator is outside of the relative applicator path.

9. A computer-implemented method of generating presentations of makeup applications, the method comprising:
receiving, by a computing device, a first video of a makeup application process from a camera, wherein the first video depicts at least a portion of a face and at least a portion of an applicator;
receiving, by the computing device, signals from at least one motion sensor indicating motion of the applicator;
measuring, by the computing device, the motion of the applicator with respect to one or more landmarks of the face to determine a relative applicator path;
measuring, by the computing device, an amount of deflection shown in the first video of the portion of the applicator to determine an amount of force with which the applicator is applied;
adding, by the computing device, the amount of force to the relative applicator path; and
storing, by the computing device, the relative applicator path.

10. The method of claim 9, wherein the at least one motion sensor is removably coupled to the applicator, is permanently attached to the applicator, or is coupled to a glove worn by a hand holding the applicator.

11. The method of claim 9, wherein the computing device is a mobile computing device that includes a display.

12. The method of claim 11, wherein the camera is a front-facing camera of the mobile computing device.

13. The method of claim 12, further comprising:
receiving, by the computing device, a second video from the camera, wherein the second video is a live video that depicts at least a portion of the face and at least a portion of the applicator;
aligning, by the computing device, the relative applicator path to one or more landmarks of the face; and
presenting, by the computing device, the relative applicator path in association with capturing the second video.

14. The method of claim 13, wherein the first video and the second video include depth information.

15. The method of claim 13, wherein presenting the relative applicator path in association with capturing the second video includes providing the presentation of the relative applicator path as superimposed images on the second video on the display.

16. The method of claim 13, wherein presenting the relative applicator path in association with capturing the second video includes:
comparing a detected location of the applicator to the relative applicator path; and
providing haptic feedback in response to determining that the detected location of the applicator is outside of the relative applicator path.

17. A computing device, comprising:
circuitry for receiving a first video of a makeup application process from a camera, wherein the first video depicts at least a portion of a face and at least a portion of an applicator;
circuitry for receiving signals from at least one motion sensor indicating motion of the applicator;
circuitry for measuring the motion of the applicator with respect to one or more landmarks of the face to determine a relative applicator path;

circuitry for measuring an amount of deflection shown in the first video of the portion of the applicator to determine an amount of force with which the applicator is applied;

circuitry for adding the amount of force to the relative applicator path; and circuitry for storing the relative applicator path.

18. The computing device of claim 17, wherein the at least one motion sensor is removably coupled to the applicator, is permanently attached to the applicator, or is coupled to a glove worn by a hand holding the applicator.

19. The computing device of claim 17, wherein the computing device is a mobile computing device that includes a display, wherein the camera is a front-facing camera of the mobile computing device, and wherein the computing device further comprises:

circuitry for receiving a second video from the camera, wherein the second video is a live video that depicts at least a portion of the face and at least a portion of the applicator;

circuitry for aligning the relative applicator path to one or more landmarks of the face; and circuitry for presenting the relative applicator path in association with capturing the second video.

20. The computing device of claim 19, wherein presenting the relative applicator path in association with capturing the second video includes providing the presentation of the relative applicator path as superimposed images on the second video on the display.

\* \* \* \* \*